United States Patent

Ettinger et al.

[15] 3,693,050

[45] Sept. 19, 1972

[54] SINGLE MODULE POWER SUPPLY

[72] Inventors: James P. Ettinger; Christian S. Otteson, both of Ridgefield, Conn.

[73] Assignee: Electric Regulator Corporation, Norwalk, Conn.

[22] Filed: Jan. 21, 1971

[21] Appl. No.: 108,309

[52] U.S. Cl. ....................317/99, 317/119
[51] Int. Cl. ....................H02b 1/02
[58] Field of Search ....................317/99, 100, 119, 120; 174/138

[56] References Cited

UNITED STATES PATENTS

| | | | |
|---|---|---|---|
| 2,984,698 | 5/1961 | Strauss | 174/138 |
| 3,309,577 | 3/1967 | Roll | 317/99 |

*Primary Examiner*—Lewis H. Myers
*Assistant Examiner*—U. Weldon
*Attorney*—James and Franklin

[57] ABSTRACT

A power supply unit for converting an alternating current input to a controlled direct current output, comprises a rectifier module having a plurality of rectifiers serially arranged in substantial alignment with appropriate electrically conductive spacers therebetween. Heat dissipating fins or plates are interleaved between the rectifiers and spacers and serve as electrically and thermally conductive means. A pair of electrically conductive jumper plates are provided operatively connecting selected terminals of said rectifiers to complete the operative circuit. The module is slidably mounted in a housing having a relatively massive bus bar network secured on an insulating member disposed on the back wall of said housing by novel fastening means. Said fastening means includes a screw extending from the back wall of the housing through apertures in said insulating member and an insulative nut member adapted to engage said screw and to seal said aperture to prevent any arcing or leakage from the bus bar network to the housing. The external leads extend through an aperture in the back wall of the housing and may be conveniently connected to the appropriate module terminals, there being considerable space between the back wall and the module for this purpose.

8 Claims, 10 Drawing Figures

INVENTOR
JAMES P. ETTINGER
CHRISTIAN S. OTTESON
BY
James and Franklin
ATTORNEY

INVENTOR
JAMES P. ETTINGER
CHRISTIAN S. OTTESON
BY James and Franklin
ATTORNEY

INVENTOR
JAMES P. ETTINGER
CHRISTIAN S. OTTESON
BY James and Franklin
ATTORNEY

INVENTOR
JAMES P. ETTINGER
CHRISTIAN S. OTTESON
BY James and Franklin
ATTORNEY

INVENTOR
JAMES P. ETTINGER
CHRISTIAN S. OTTESON
BY
James and Franklin
ATTORNEY

SINGLE MODULE POWER SUPPLY

The present invention relates to a power supply and more particularly a power unit in which the various operative components, both power handling and control, are in the form of semiconductor components arranged compactly within a single removable module.

Conventionally, power supplies in the large power handling categories are extremely bulky, heavy and expensive. A traditional DC power supply designed to drive a multi-horsepower motor, e.g., one in the 150 h.p. range comprises a piece of equipment of the size of a medium truck and weighing up to 8 tons. It consists of a combination of motors, generators and regulators linked together to change utility power to controlled output power. The need for such power supplies is particularly great where the utility power is in the form of AC and the motor to be driven is of the DC type, the power supply therefore having to convert the AC to DC type, the power supply therefore having to convert the AC to DC while at the same time permitting control of the output power, so that, for example, the speed of the motor may be adjusted and then regulated to remain constant over a wide range of load conditions.

Conventional equipment of this type is also difficult to maintain and repair. This is a particularly important drawback; the size and cost of the units make it extremely impractical for most plants to maintain a stand-by unit. Consequently, if anything goes wrong with the power supply, the motor driven thereby must remain idle during the time it takes to repair or adjust the power supply, and the apparatus driven by the motor is likewise idled. The economic loss involved in the "-down time" of power supplies is therefore extremely significant.

Repair or replacement of such conventional power supplies is commonly quite time consuming and expensive. Often many properly working parts must be disassembled or disconnected merely to gain access to the defective element or elements. In addition, because of the factors outlined above, making repairs involves considerable skill and adequately trained maintenance personnel are often unavailable for this job.

A further disadvantage of the conventional type of power supply is that it must in large measure be individually designed for each specific application. As a result such units not only have high initial cost but are extremely limited as regards flexibility of use within a given plant or factory. If the application requirements change radically, as for instance where the plant is modernized by the replacement or addition of new equipment, a redesign and reconstruction of the power supply as a whole is generally required.

In recent years with the development of solid state electronics, the use of semiconductor components first for control functions and then for power handling functions has contributed greatly to the reduction in size and weight which is characteristic of the power supply of the present invention. Thus in effect, a second generation of power supplies utilizing primarily solid state components has been developed.

A still more recent development in power supplies utilizes the modular approach in which the various operative components, both power-handling and control, are designed in the form of readily attachable and detachable modules, thereby to facilitate repair, replacement and modification of electrical characteristics. This modular approach is characteristic of a third generation of small, light and compact assemblies which are nevertheless capable of handling large amounts of power with an exceptionally high degree of safety and efficiency. An example of one such power supply using this approach is found in our copending application Ser. No. 702,089, filed Jan. 31, 1968 and entitled "Modular Power Supply."

The present invention represents a fourth generation of power supplies characterized by having all the components assembled in a single extremely small, light weight and compact module which is easily removable from its casing. The combination of extremely small size, extremely high safety and reliability, and extremely simple assembly, replacement, repair and modification is achieved in accordance with the present invention by a single module approach which is entirely novel in this field. The power handling leads are in the form of a network of heavy bus bars mounted on and insulated from the framework of the module. As a result, the power supply is characterized by a high degree of safety particularly with regard to resistance to overloads. These bus bars serve not only to conduct power to the power handling semiconductor devices, but also serve to support these devices on the assembly.

An unusually compact module is made possible by a novel arrangement of the solid state power handling devices, together with its associated heat dissipating structure. Thus, these devices are serially arranged in substantial alignment within the framework of the module and heavy jumper plates are adapted to electrically connect these devices in the desired electrical circuit. In this regard, the massive heat dissipating structure also serves as electrically conductive means between the terminals of the semiconductor devices and the jumper plates. The entire unit is mounted in spaced relationship in a surprisingly small cabinet, the back wall of which is provided with a large aperture through which the external leads may extend. The module is adapted to be slid into and out of the cabinet by means of a track assembly extending from the side walls thereof and the appropriate electrical connections are made to the bus bar network which is mounted on the bottom portion of the back wall of the cabinet. The module in its operative position is substantially spaced from the back wall and the bus bar network to provide adequate space for connecting the relatively massive lead cables to the unit. The power section and the control or regulator section of the power supply are maintained mechanically distinct as well as electrically separate, thus facilitating repair and maintenance.

The embodiment of the power supply here specifically illustrated is designed to convert three-phase AC into DC and to drive a DC motor in such fashion that the speed thereof may be accurately controlled and maintained, but it will be understood that this is by way of exemplification only, both as to general type of application and as to specific power and control circuitry, and that the single module power supply approach and the specific aspects thereof embodied in the following disclosure are conducive to a vast range of other applications.

To the accomplishment of the above and to such other objects as may hereinafter appear, the present invention relates to the construction and arrangement of a single module power supply, as defined in the appended claims and as described in this specification, taken together with the accompanying drawings, in which:

Figure 4:
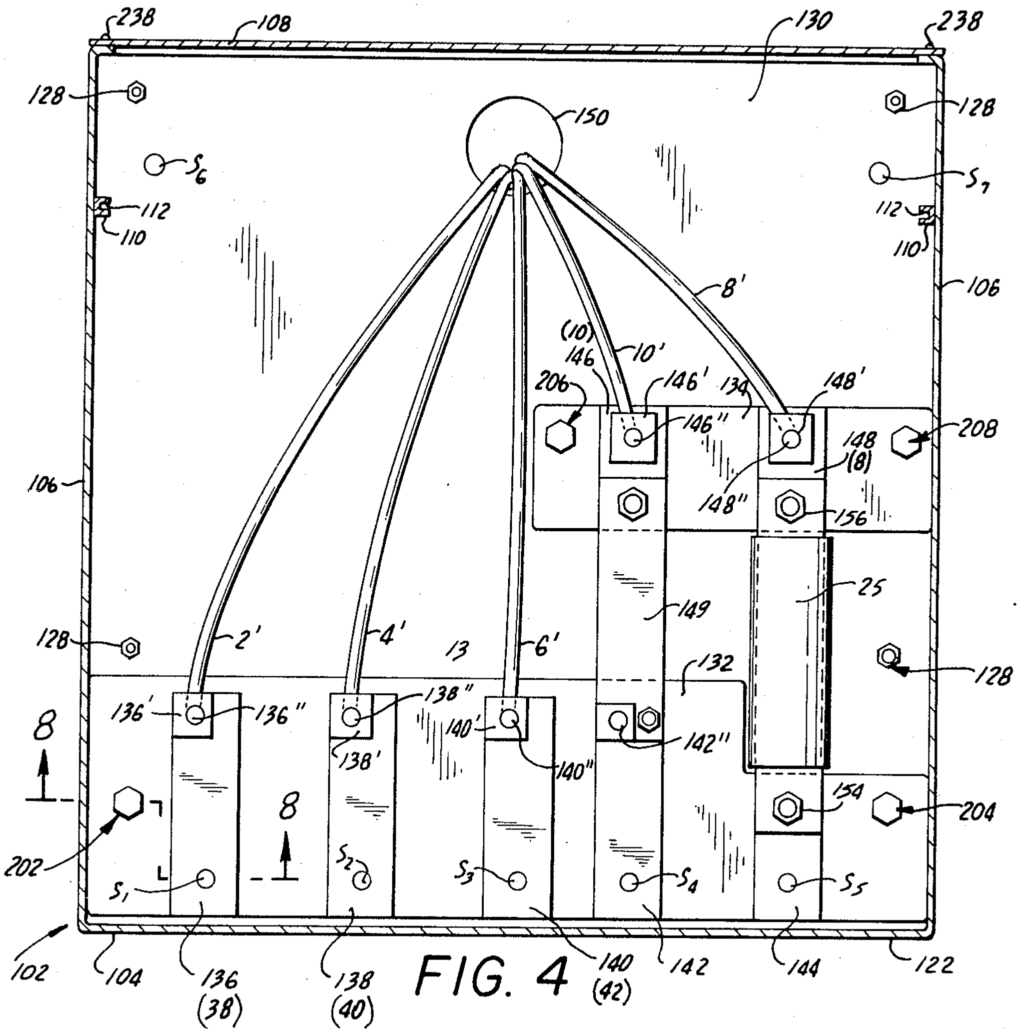
FIG. 4 is a cross-sectional view of the power module of the present invention taken along the line 4—4 of FIG. 2.
Figure 5:
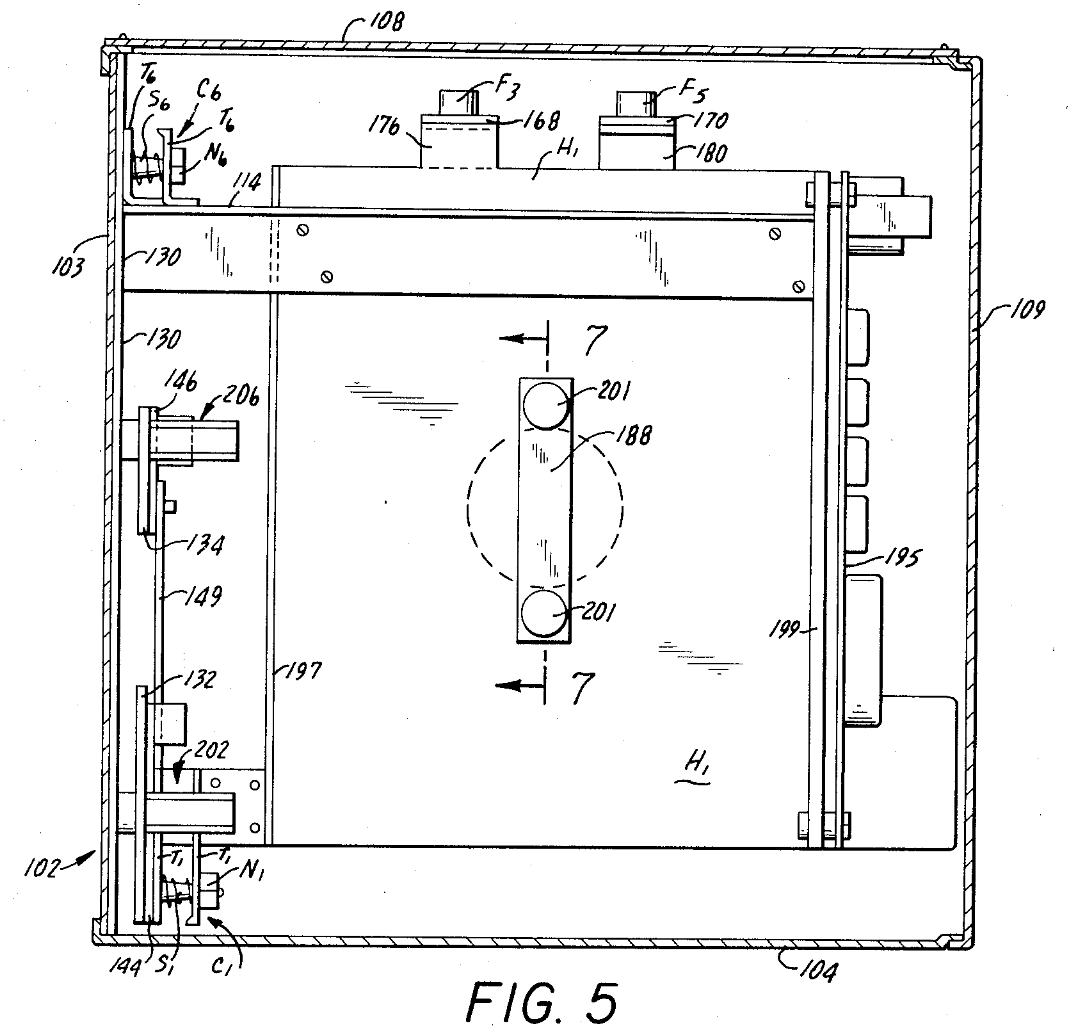
FIG. 5 is a cross-sectional view of the power supply module of the present invention taken along the line 5—5 of FIG. 3.
Figure 7:
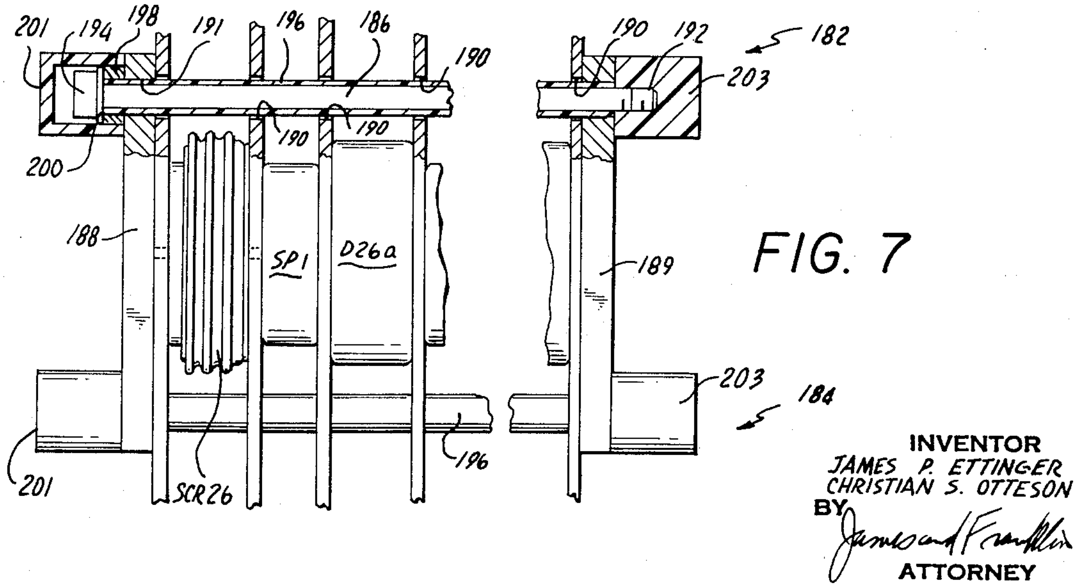
Figure 8:
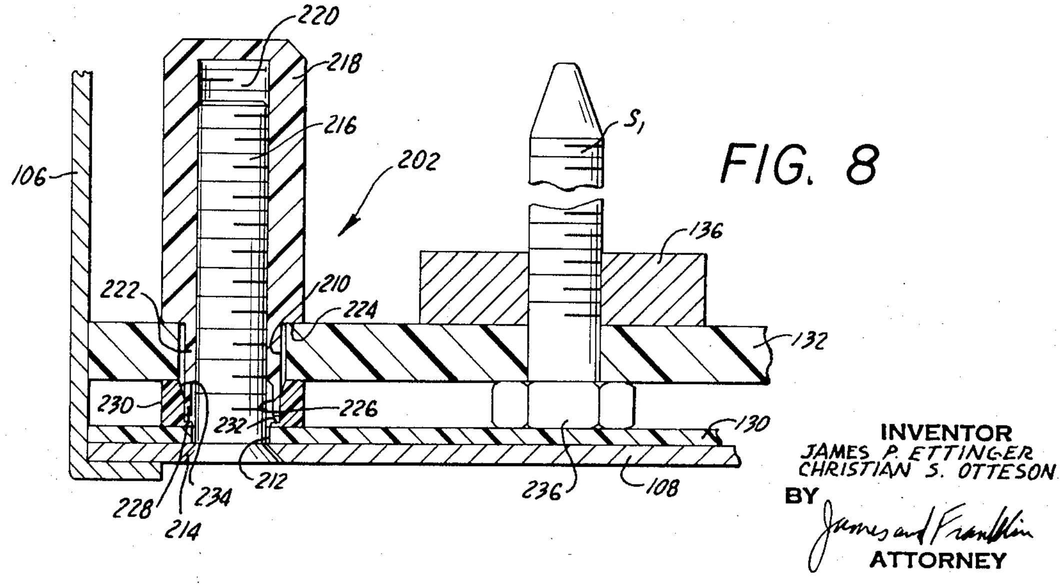

FIG. 7 is an enlarged fragmented cross-sectional view of a portion of the power supply module of the present invention taken along the line 7—7 of FIG. 5 and illustrating in detail the arrangement of semiconductor components and their associated heat dissipating structure; and FIG. 8 is a partial cross-sectional view on an enlarged scale taken along the line 8—8 of FIG. 4 and showing the bus bar mounting arrangement on the back wall of the module cabinet.

Figure 1A:
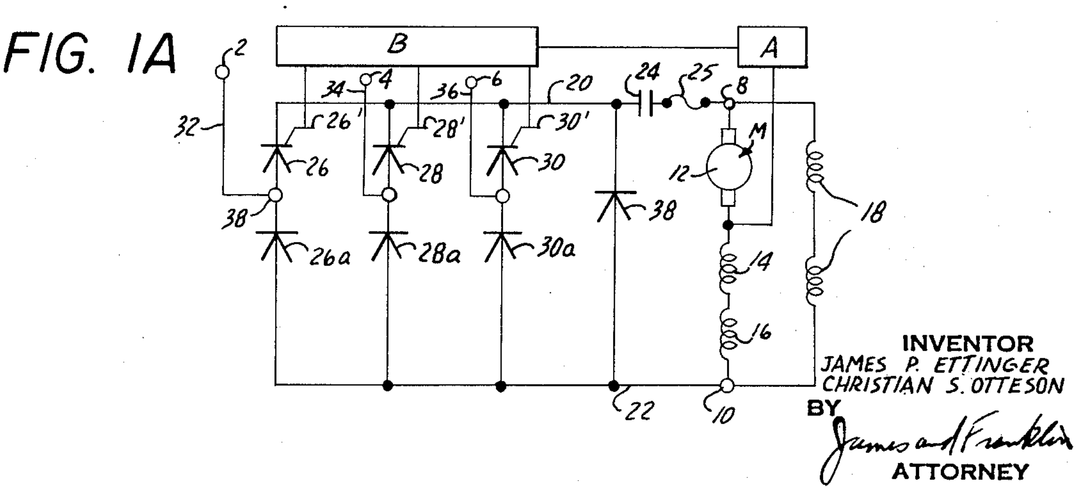
FIG. 1A is a schematic circuit diagram of the basic circuit arrangement used to convert three-phase AC current into controlled DC for driving a DC shunt motor.

Referring to the drawings and in particular to FIG. 1A, there is illustrated the basic rectifier circuit of a power supply unit of the type herein described. It is specifically designed to convert a three-phase AC input to a controllable DC output which in turn controllably drives a DC shunt field motor generally designated M. The three-phase alternating current input is applied at terminals 2, 4 and 6, and the DC output to the motor is provided at terminals 8 and 10, respectively. The motor M has an armature 12, a commutating field winding 14 and a stabilizing field winding 16 connected in series with one another across the output terminals 8 and 10. In addition it also has appropriately energized shunt field windings 18.

The power supply has power lines 20 and 22 connected to the terminals 8 and 10, respectively. An isolating on-off switch 24 is interposed in the line 20 adjacent the output terminal 8, and a fuse 25 is interposed in the line 20 between the switch 24 and the terminal 8. Connected between the lines 20 and 22 are three pairs of series-connected rectifiers 26 and **26*a*, 28 and 28*a*, and 30 and 30*a*, respectively, rectifiers 26, 28 and 30 being controlled rectifiers while rectifiers 26*a*, 28*a* and 30*a* are conventional diodes. Lines 32, 34 and 36 extend from the input terminals 2, 4 and 6, respectively, to points 38, 40 and 42, respectively, between rectifier 26 and diode 26*a*, rectifier 28 and diode 28*a*, and rectifier 30 and diode 30*a*, respectively. The controlled rectifiers 26, 28 and 30 have control electrodes 26', 28' and 30', respectively, each of which is associated with appropriate control circuitry (not shown). This circuitry includes capacitors, switches and magnetic amplifiers all as described in some detail in the aforementioned prior application Ser. No. 702,089. It should be noted that this control circuitry is provided with adjustable means for controlling minimum speed, IR compensation, maximum current, and maximum speed of operation of motor M, respectively. The control circuitry for actuating switch 24 is also disclosed in some detail in the aforementioned copending application Ser. No. 702,089 and will therefore not be described herein. A diode type rectifier 38 is connected across power lines 20 and 22**.

The remainder of the circuitry is primarily utilized for sensing and control and is not specifically illustrated herein. In general the sensing portion of the circuitry is illustrated schematically by the rectangle designated A. That portion thereof enclosed within the rectangle B constitutes the bulk of the circuitry which triggers or controls the control rectifiers 26, 28 and 30 in accordance with the signals derived from the sensing and reference circuitry mainly retained within rectangle A.

Only so much of the circuitry involved as is believed to be relevant to the single module construction of the present power unit and the rationale and advantages of this structure has been described in any detail.

POWER HANDLING COMPONENTS AND MOUNTING THEREFOR

BUS BAR STRUCTURE

Figure 2:
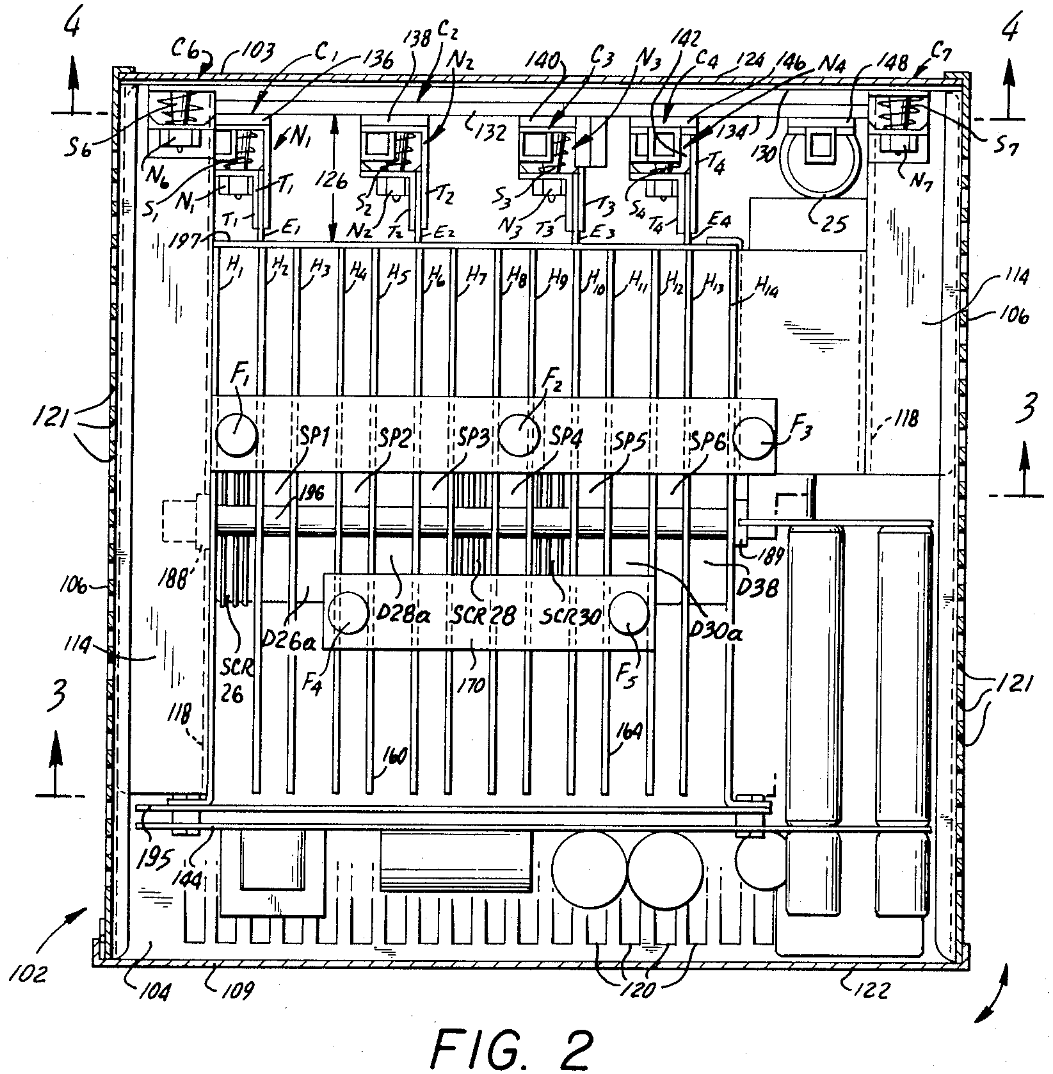
FIG. 2 is a top plan view of the power supply module of the present invention showing the terminal connections at the rear wall and the electrically conductive jumper plates.
Figure 3:
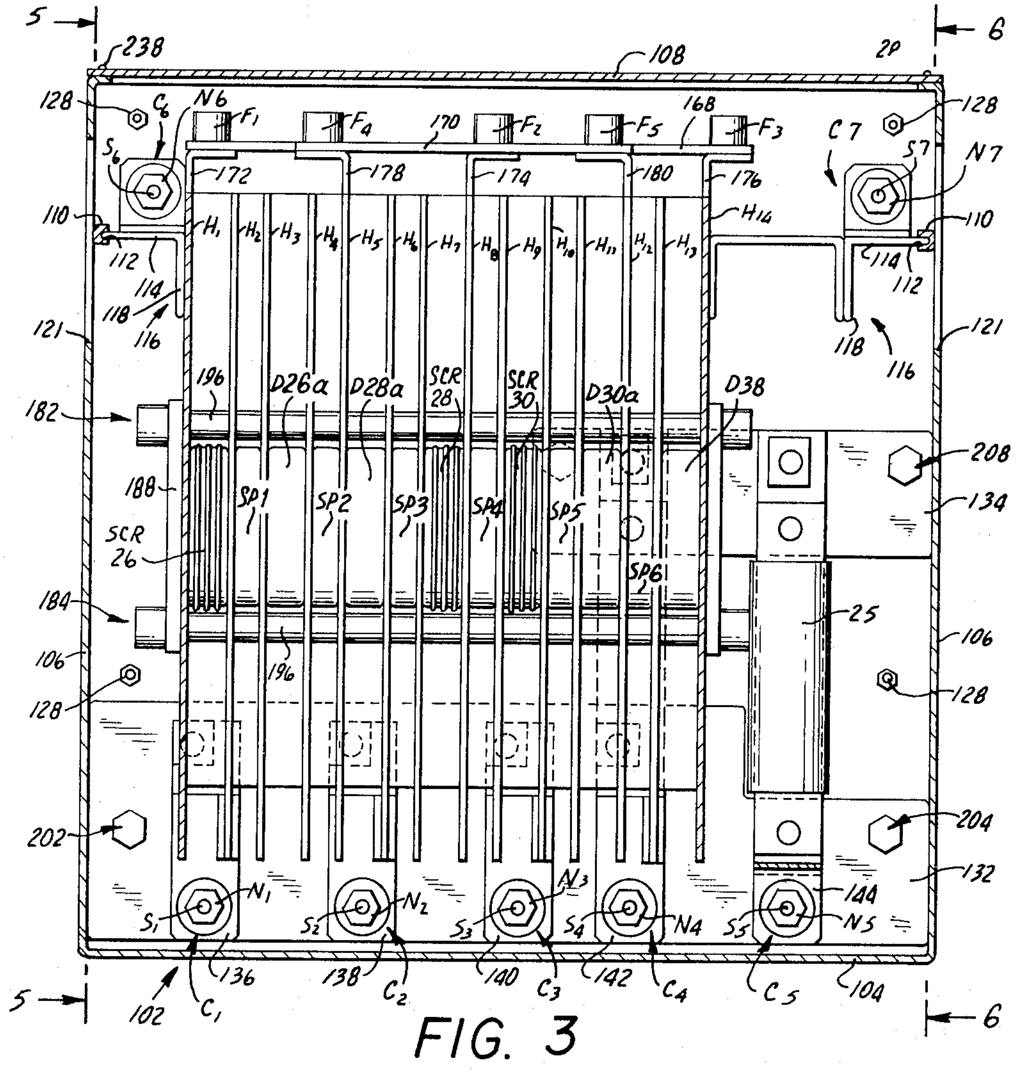
FIG. 3 is a partial cross-sectional view taken along the line 3—3 of FIG. 2.

Turning now to the structure and arrangement of the single module power supply, as best illustrated in FIGS. 2 and 3, it comprises a cabinet generally designated 102 of appropriate size having a rear wall 103, a bottom wall 104, side walls 106, and a top wall 108. By virtue of the single module construction hereinafter described, the cabinet 102 may be of surprisingly small size considering the power handling capacity of the power supply, a cabinet measuring one cubic foot in volume being quite adequate for a power supply capable of driving a 150 horsepower DC motor. Side walls 106 are provided with parallel horizontally extending track means 110 at the inner surface thereof near the top wall 108. Track means 110 are provided with narrow slots 112 adapted to slidably receive rails 114 comprising one leg of an angle bar generally designated 116, the other leg 118 being secured to the structural members of the power module by any suitable means. Thus the entire module is easily removed from the cabinet for maintenance and repair and replaced therein by virtue of the sliding engagement of rails 114 in slots 112. Track means 110 serve the additional purpose of mounting the entire unit in spaced relationship from the top, bottom and side walls of the cabinet to provide good electrical insulation therefrom and to provide increased convective heat dissipation.

As best shown in FIGS. 2 and 3 both the bottom wall and the side walls of cabinet 102 are provided with a plurality of slots to provide for adequate ventilation and convective heat dissipation. Slots 120 in the bottom wall 104 extend horizontally from front to rear and slots 121 in side walls 106 extend vertically and are provided only at the top portion thereof in the vicinity of track means 110. A front door 122 is hingedly connected to one of the side walls 106 and remains closed during operation.

As best shown in FIG. 2 the external connections to the unit are made at the rear wall 103, there being a substantial space 126 between the unit and said rear wall to provide adequate room for making such external connections.

FIG. 4 illustrates the back wall with the power unit cut away. As there shown, there is mounted on this wall in any appropriate manner, as by nuts 128, a support plate 130 of heavy insulating material. Two heavy insulating plates 132 and 134 are mounted on support plate 130 in a manner to be hereinafter described in detail. A network of comparatively massive, substantially rigid bus bars are mounted on the insulating plates 132 and 134 also in a manner hereinafter to be described in detail, said bars serving as the leads for power conduction. Bus bars 136, 138, 140, 142 and 144 are all mounted vertically on mounting block 132 adjacent the bottom wall 122 of the cabinet. Bus bars 146 and 148 are mounted on mounting block 134. Bus bar 139 is connected between bus bars 142 and 146. The upper ends of bus bars 136, 138 and 140 are provided with suitable electrical connectors 136', 138' and 140' secured thereto by screws 136'', 138'' and 140'', respectively, and corresponding to input terminals 2, 4 and 6 of the circuit of FIG. 1A, respectively. External leads 2', 4' and 6' are connected through apertures 150 in the back wall 103 and support plate 130 to the appropriate AC outlet terminals. The fuse 25 is electrically connected by suitable means 154, 156 between bus bars 144 and 148.

Bus bars 136, 138 and 140 correspond to circuit leads 32, 34 and 36 respectively (see FIG. 1A). The upper ends of bus bars 148 and 146 are also provided with electrical connectors 148' and 146' secured thereto by screws 148'' and 146'' respectively, and corresponding to the output terminals 8 and 10 respectively of the circuit of FIG. 1A to which the external leads 8' and 10' are connected, the leads 8' and 10' also extending through apertures 150 in the back wall. Bus bar 148 corresponds to that portion of line 20 between output terminal 8 and fuse 25. Bus bar 144 corresponds to that portion of line 20 between fuse 25 and switch 24 (the switch being provided on the module itself). Bus bars 146, 149 and 142 correspond to line 22. To aid in comparing the power circuitry of FIG. 1A with the bus bar structure of FIG. 4, circuit reference numerals are applied in parenthesis, where appropriate, to the showing of FIG. 4.

POWER HANDLING MODULE

Figure 1B:
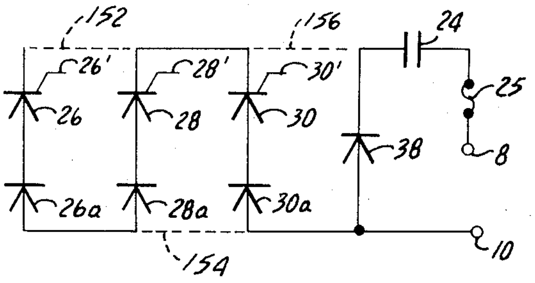
FIG. 1B is a schematic circuit diagram of the basic electrical arrangement of the solid state components within the power supply module, the jumper connections being illustrated in the broken lines.

The remainder of the power circuitry, comprising the controlled rectifiers 26, 28 and 30, the non-controlled diodes **26*a*, 28*a* and 30*a*, the across-the-line diode 38, and the switch 24 is mounted in a single module adapted to be mounted centrally of the cabinet and to be readily secured to and detached from the appropriate bus bars in order to complete the power circuit. In order to provide a compact arrangement rectifiers 26, 28, 30, and diodes 26*a*, 28*a*, 30*a*, and 38 are all connected serially as schematically illustrated in FIG. 1B. It will be apparent from that diagram that the circuit arrangement of FIG. 1A may be conveniently assembled merely by making appropriate electrical connections between the terminals of the serially connected rectifiers. FIG. 1B illustrates such connections in broken lines. Thus, broken line 152 represents the connection between the cathode of controlled rectifier 26 and the cathode of controlled rectifier 28; broken line 154 represents the connection between the anode of diode 28*a*** *and the anode of diode* *30a*; broken line 156 represents the connection between the cathode of controlled rectifier 30 and the cathode of across-the-line diode 38.

To the further accomplishment of compactness, it has been found particularly advantageous to utilize the relatively massive heat dissipating structure, in part, as the foregoing electrical connection means. This is best illustrated in FIG. 3 in which the disc-like structures designated SCR 26, SCR 28 and SCR 30 correspond to silicon controlled rectifiers 26, 28 and 30 of FIG. 1B. The disc-like structures designated D**26*a*, D28*a*, D30*a* and D38 correspond respectively to diodes 26*a*, 28*a*, 30*a* and 38 of FIG. 1B. It will be seen from FIG. 3 that both terminals of each controlled rectifier and diode are in heat transfer contact with a relatively massive heat dissipator fin or plate generally designated H, said plates being substantially of a square configuration and taking up in volume most of the cabinet space. In addition, the dissipator plate designated H2 is electrically connected to the anode of controlled rectifier SCR 26, dissipator plate H5 is electrically connected to the anode of diode D28*a*, dissipator plate H8 is electrically connected to the anode of controlled rectifier SCR 28, dissipator plate H12 is electrically connected to the anode of diode D30*a*, and dissipator plate H14 is electrically connected to the cathode of diode D38**.

The remaining disc-like structures designated SP1–SP6 comprise electrically conductive spacer means and serve to separate the adjacent dissipator plates H which are electrically and thermally connected to the oppositely facing terminals of the serially connected diodes and rectifiers.

As best shown in FIG. 2 two electrical jumper plates 168 and 170 are provided for making the appropriate electrical connections in accordance with the broken line representations of FIG. 1B. For this purpose the appropriate dissipator plates are provided with integrally formed angle bar feet extending outwardly from their top edges (FIG. 3). As there shown jumper plate 168 is connected by suitable fastening means F1, F2 and F3 to feet 172, 174 and 176 extending from dissipator plates H1, H8 and H14, respectively. Jumper plate 170 is connected by suitable fastening means F4 and F5 to feet 178 and 180 extending from dissipator plates H5 and H12, respectively. Thus, jumper plate 168 electrically connects dissipator plates H1, H8 and H14 and thus corresponds to broken lines 152 and 156 in FIG. 1B and jumper plate 170 electrically connects dissipator plates H5 and H12 and thus corresponds to broken line 154 of FIG. 1B.

Figure 1C:
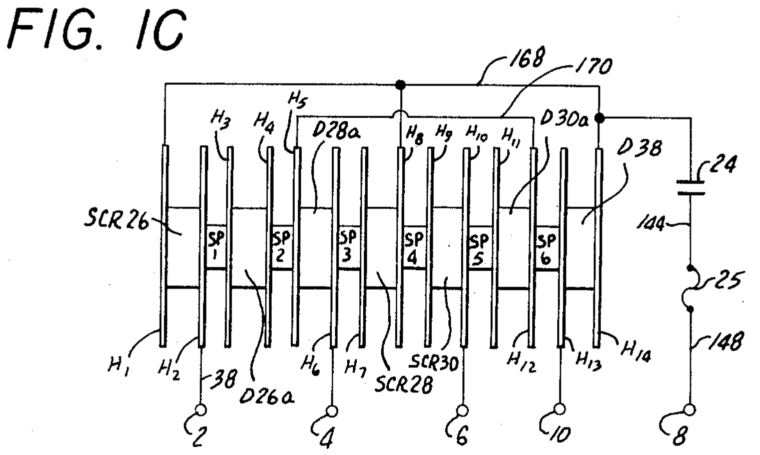
FIG. 1C is a schematic illustration of the physical arrangement of the various semiconductor components and associated heat dissipating structure as they are mounted within the power supply module of the present invention, including a schematic illustration of the electrically conductive jumper plates.

For convenience, the foregoing arrangement is schematically illustrated in FIG. 1C, in which all elements and lead lines are designated by reference numerals corresponding to that of FIG. 3.

Referring again to FIG. 3 it will be seen that the foregoing assembly of controlled rectifiers, diodes, spacers and heat dissipating plates are assembled and maintained in proper relationship by a bolt assembly comprising a pair of elongated bolt means generally designated 182 and 184, respectively. Bolt means 182 and 184 are adapted to be received in registering apertures 190 (FIG. 7) in the heat dissipating plates just above and below the rectifier assembly. The construction of this bolt assembly is best illustrated in FIG. 7. As there shown each assembly comprises an elongated bolt 186 extending transversely through the apertures in successive heat dissipating plates. As shown in the drawing, two fastener plates 188 and 189 are disposed at either side of the dissipator assembly and are provided with registering apertures 191 through which bolt 186 extends. Bolt 186 is threaded at one end 192 and provided with an enlarged head portion 194 at its other end. Generally, all of these parts are composed of electrically conductive materials, and thus are electrically connected together. Since an extremely high potential difference will exist between the electrically conductive heat dissipating plates H, the bolts must be carefully insulated from such plates. In order to effect the proper electrical insulation elongated tubes 196 enclose the bolts 186 and separate these bolts from the heat dissipating plates H, through which they pass. These tubes may be composed of a relatively inexpensive insulating material such as nylon. They are also useful for guiding the bolts 186 during the manipulation thereof in the assembly process. Additional insulation is provided by insulating washers 198 which are positioned between fastening plate 188 and the bolt heads 194. Metallic washers 200 may be interposed between the bolt heads 194 and insulating washers 198 to provide an even distribution of pressure from the bolt heads. The insulating washers 198 are composed of a material different from that of the guide tubes 196, since these members also serve to apply a holding force to the dissipator plates. A typical material which provides both electrical insulation and pressure resisting properties is steatite, a commercially available ceramic material. Insulating heads 201 are operatively connected to insulating washers 198 to further insulate the bolt heads from the remainder of the assembly, thereby to prevent arcing between adjacent parts. Internally threaded insulating heads 203 engage the threaded end 192 of bolts 186 to secure the assembly.

The heat dissipating plates H and the rectifiers, diodes and spacers disposed therebetween may be provided with any suitable means for maintaining alignment of the operative electrical elements when assembled as shown in FIG. 3. Such means, for instance, may comprise centrally located dimples on each dissipator plate adapted to be received in corresponding recesses in the operative rectifiers, diodes and spacers. Alternately, locating pins cooperating with apertures in the heat dissipating plates and registering recesses in the operative electrical elements may be utilized.

As best shown in FIG. 2, front and rear insulating plates 195 and 197, respectively, are disposed transversely of the heat dissipator plates H to enclose the module. In addition, a forward mounting plate 199 is secured to insulating plate 195 in parallel relationship thereto by suitable fastening means for the purpose of mounting control circuit components. The remaining control circuit components are mounted between the power module and the right side cabinet wall 106 is any suitable fashion.

Figure 6:
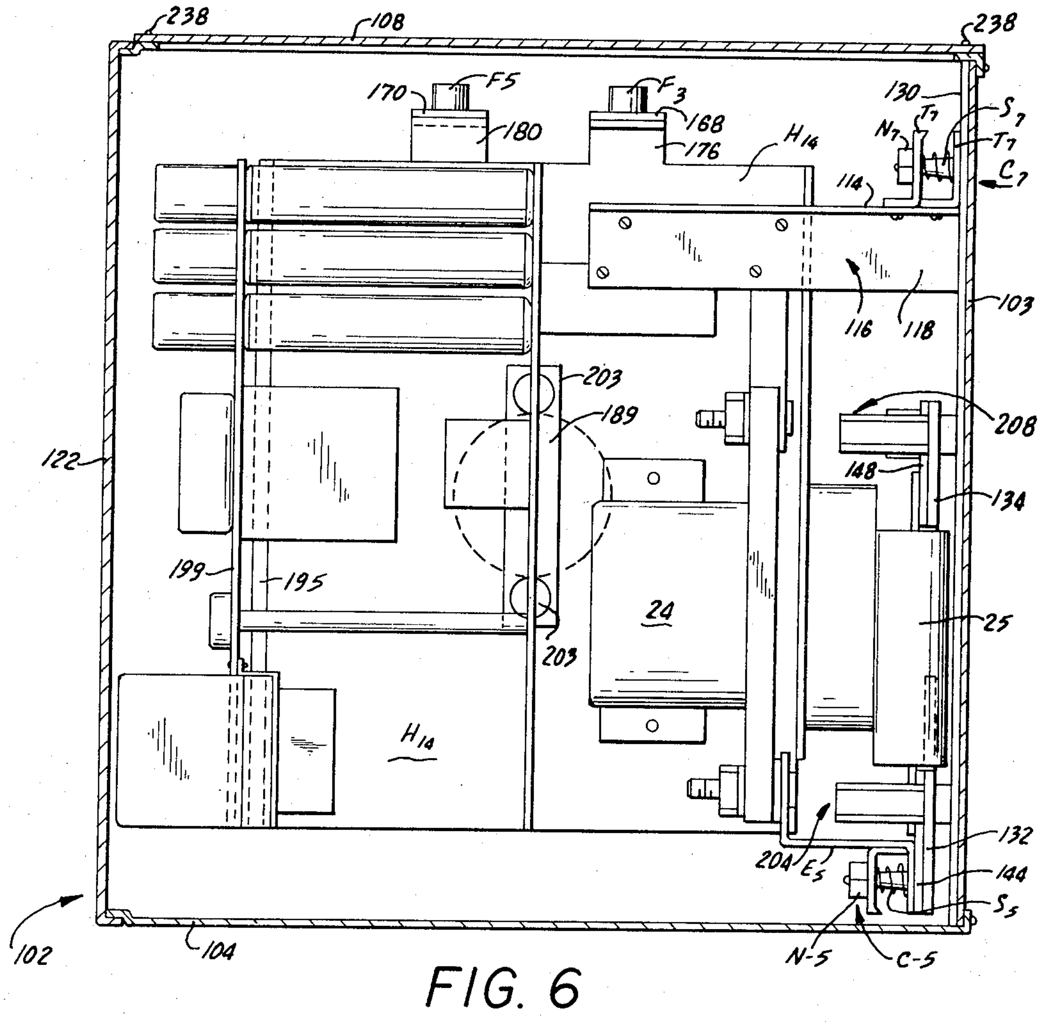
FIG. 6 is a cross-sectional view of the power supply module of the present invention taken along the line 6—6 of FIG. 3.

The power supply assembled in accordance with the foregoing is adapted to be mounted on, secured to and electrically connected to the appropriate sections of the bus bars mounted on the rear wall. As best shown in FIG. 2 this is accomplished by means of quick detachable captive nut assemblies generally designated C1 through C5. (Assembly C5 is shown in FIG. 6.) The assembly preferably used is that disclosed in our U.S. Pat. No. 3,490,509, issued Jan. 20, 1970, and entitled "-Captive Nut Assembly." The disclosure of said aforementioned patent is incorporated into this application by reference, it being understood that the specific structure there disclosed, while believed to be exceedingly advantageous in facilitating the connection and disconnection of said module to and from the bus bar structure, is not essential to those aspects of the power supply structure herein described and claimed.

As is made clear by said aforementioned patent, and as may be seen particularly from FIG. 2, dissipator plates H2, H6, H10 and H13 are provided with extending portions generally designated E1 through E4, respectively. Each such extending portion is provided with a pair of right angle feet or terminals T1 through T4 fastened respectively to extending portions E1 through E4 at either side thereof and extending at right angles therefrom in longitudinally spaced relationship, and carrying securing devices such as captive nuts N1 through N4, which nuts are adapted to register and engage with appropriately positioned screws S1 through S4 extending outwardly from the appropriate portions of the rigidly mounted bus bars (see also FIG. 4). Engagement between the nuts N and the corresponding screws S acts to firmly clamp upper terminals or feet T against those portions of the bus bars which carry the screws S, thereby to mount and secure the power module firmly in position and at the same time to press the conductive feet or upper terminals T into firm electrical connection with said bus bars. It will be seen that the foregoing connections correspond to the terminals 2, 4, 6 and 10 of the schematic shown in FIG. 1C. As best shown in FIG. 6, the fifth captive nut assembly C5 provides a detachable electrical connection between fuse 25 and switch 24 by the mounting of nut N5 on screw S5. Switch 24 is in turn electrically connected to dissipator plate H14 (cathode of diode 38) by any suitable means (not shown) to complete the circuit (see FIGS. 1B and 1C). Two additional captive nut assemblies C6 and C7 are provided on rails 114 at the upper right and left hand corners of the power module for connection to appropriate screws S6 and S7 extending outwardly from support plate 130. Thus the entire power module may be removed from the cabinet for maintenance or repair merely by unscrewing the seven captive nuts C1 through C7 and sliding the module along track means 112 out of the cabinet.

It will be appreciated that the bus bars mounted on mounting blocks 132 and 134 are designed to carry extremely high power. It is thus imperative that there be no arcing or leakage paths between the bus bar assembly and the metallic cabinet. To insure against such possibility, mounting blocks 132 and 134 are mounted on the back wall of the cabinet by means of novel insulating fasteners generally designated 202, 204, 206 and 208. One such fastener 202 is shown in detail in FIG. 8, which is an enlarged sectional view of the lower left hand corner of mounting block 132 as shown in FIG. 4. It will be appreciated that the remaining fasteners 204–208 are of identical construction.

As there shown mounting block 132 is provided with an aperture 210 registering with apertures 212 and 214 in insulating plate 130 and the back wall 108 of the cabinet, respectively.

Aperture 214 is countersunk to receive the bevel of a flat head threaded stud 216 flush with the cabinet surface, stud 216 extending through apertures 212 and 210 in plate 130 and insulating block 132, respectively. A cylindrical nut-shaped cover member 218 is provided with an internally threaded hollow 220 adapted to receive the threaded end of stud 216. Cover member 218 is made of a suitable insulating material such as nylon and is provided at its open end with an annular lip 222 of reduced outer diameter defining a shoulder 224. Lip 222 is received within aperture 210 in mounting block 132 and extends therethrough with a slight clearance. That portion of lip 222 extending below mounting block 132 is counterbored at 226 to provide an annular wall 228 of reduced thickness. Wall 228 engages an annular insulating washer 230 disposed between insulating block 132 and plate 130. Washer 230 is counterbored at 232 and countersunk at 234 to receive the outer surface of wall 228 in tight sealing engagement. In this regard the countersink 234 in washer 230 and the reduced thickness of wall 228 cooperate to provide a slight resilient deformation of wall 228 upon engagement with washer 230, thereby to provide a tight seal between the two.

The method of securing mounting block 132 to the back wall 108 of the cabinet will now be apparent. Insulating support plate 130 is first placed on and, if desired, secured to back wall 103 in any appropriate manner. The bus bars 136–148 are then mounted on mounting block 132 by means of screws S1–S5, 136″–148, screws S1–S5 extending upwardly therethrough (it will be recalled that these screws are used in cooperation with captive nut assemblies E1 through E5). Annular washers 230 are then placed in position on plate 130 in registry with apertures 212 therein and the mounting blocks 132 and 134 are placed thereover with apertures 210 registering with washers 230. It will be appreciated that washer 230 has substantially the same thickness as the head 236 of screw S, so that block 132 is evenly spaced from plate 130 as shown. Screw 216 is then inserted through the registering apertures in wall 108, plate 130, washer 230 and block 132. Finally cover member 218 is screwed onto screw 216 until shoulder 224 tightly engages the upper surface of block 132 thereby to establish an airtight seal around screw 216 as shown. It will be appreciated that this configuration is effective to prevent not only leakage but also arcing between bus bar 136 and the metallic back wall 103 of the cabinet through aperture 210 in mounting block 132.

For purposes of assembly as best shown in FIG. 3, the single module is slid into the cabinet along track means 110 until the captive nuts N1 through N7 engage the screws S1 through S7 extending from the back wall of the cabinet. It will be noted that track means 110 maintains the module sufficiently spaced from the top and bottom walls 108 and 104 of the cabinet so as to facilitate easy access to the captive nuts N1 through N7. Accordingly the nuts are operatively engaged with the screws by means of an appropriate tool to secure the module in its operative position within the cabinet. The external leads are inserted through apertures 150 in the back wall 103 and its contiguous insulating plate 130 (FIG. 4) and may be easily operatively attached to the appropriate terminals 136′–148′ by removing the top wall 108. For this purpose the top wall 108 is secured to the side walls by means of easily detachable snap lock means 238 (FIG. 3). Once the external leads are connected to appropriate terminals on the module as shown in FIG. 4, the top wall 108 is secured and the front door is closed. The assembly is now a fully operative compact power supply with the external leads conveniently emanating from the back wall so as to facilitate stacking and/or shelving of several modules.

For the purpose of maintenance, repair or replacement, all that need be done is to detach captive nuts N1 through N7 from their respective screws S1 through S7 and slide the module from the cabinet along track means 110. For maintenance or repair it may not even be necessary to detach the external leads from their appropriate terminals providing there is sufficient play to allow such external lead lines to be pulled through aperture 150 in rear wall 103 and plate 130.

It will be appreciated from the foregoing that we have provided a single power supply module of greatly reduced size which facilitates assembly, maintenance and replacement thereof. As a result of the novel bus bar mounting structure provided herein the power supply is characterized by a high degree of safety particularly with regard to resistance to overloads. The light weight and compactness of the module is enhanced considerably by employing metallic fins or plates as both thermally and electrically conductive means. By using this arrangement it is possible to serially arrange the operative power semiconductor components in a substantially contiguous line thereby eliminating the need for additional bulky bus bar structure.

While only a single preferred embodiment of the present invention is herein specifically described, it will be appreciated that many variations may be made therein all within the scope of the present invention as defined in the following claims.

We claim:

1. In a structure for housing high power electrical circuitry wherein electrically conductive means are mounted on one side of an insulating member, and wherein a fastening means secures said insulating member to a support in spaced relation therefrom, said insulating member having an aperture receiving one end of said fastening means therethrough with substantial clearance therearound, the improvement comprising a cover means of insulating material having an open ended hollow therein adapted to receive and retain said one end of said fastening means, said cover means having a given cross-section at its closed end and a reduced cross-section at its open end with a shoulder means therebetween, said reduced cross-sectional portion extending through said clearance and said shoulder means sealingly engaging said one side of insulating member, and insulating spacer means between said insulating member and said housing struc-ture, said reduced cross-sectional portion of said cover means sealingly engaging said spacer means, whereby said fastening means and thus said housing structure is completely sealed from said bus bar network mounted on said one side of said insulating member thereby to prevent electrical arcing from said electrically conductive means to said fastening means and said support.

2. The apparatus of claim 1, wherein said fastening means is an externally threaded stud and wherein said hollow in said cover means is internally threaded and adapted to threadingly engage said stud.

3. The apparatus of claim 1, wherein said spacer means is an annular washer of insulating material surrounding said fastening means and sealingly engaging said support and the other side of said insulating member.

4. The apparatus of claim 2, wherein said spacer means is an annular washer of insulating material surrounding said stud, and sealingly engaging said support and the other side of said insulating member.

5. The apparatus of claim 3, wherein said reduced cross-sectional portion of said cover means is received within said annular washer in tight sealing engagement therewith.

6. The apparatus of claim 4, wherein said reduced cross-sectional portion of said cover means is received within said annular washer in tight sealing engagement therewith.

7. The apparatus of claim 5, wherein the outer diameter of said reduced cross-sectional portion of said cover means is greater than the internal diameter of said annular washer and wherein at least one of said outer surface of said reduced cross-sectional portion and the inner surface of said annular washer is tapered to facilitate insertion of said reduced cross-sectional portion into said annular washer.

8. The apparatus of claim 6, wherein the outer diameter of said reduced cross-sectional portion of said cover means is greater than the internal diameter of said annular washer and wherein at least one of said outer surface of said reduced cross-sectional portion and the inner surface of said annular washer is tapered to facilitate insertion of said reduced cross-sectional portion into said annular washer.

* * * * *